US012591082B2

(12) United States Patent
Kunai et al.

(10) Patent No.: US 12,591,082 B2
(45) Date of Patent: Mar. 31, 2026

(54) OPTICAL COMPUTING DEVICE AND METHOD FOR PRODUCING SAME

(71) Applicant: Fujikura Ltd., Tokyo (JP)

(72) Inventors: Yuichiro Kunai, Tokyo (JP); Masahiro Kashiwagi, Tokyo (JP)

(73) Assignee: Fujikura Ltd., Tokyo (JP)

( * ) Notice: Subject to any disclaimer, the term of this patent is extended or adjusted under 35 U.S.C. 154(b) by 502 days.

(21) Appl. No.: 18/015,498

(22) PCT Filed: Aug. 3, 2022

(86) PCT No.: PCT/JP2022/029768
§ 371 (c)(1),
(2) Date: Jan. 10, 2023

(87) PCT Pub. No.: WO2023/067872
PCT Pub. Date: Apr. 27, 2023

(65) Prior Publication Data
US 2024/0264340 A1 Aug. 8, 2024

(30) Foreign Application Priority Data

Oct. 18, 2021 (JP) ................................. 2021-170214

(51) Int. Cl.
*G02B 5/18* (2006.01)
*G02B 27/42* (2006.01)
*G06E 1/00* (2006.01)

(52) U.S. Cl.
CPC ............. *G02B 5/18* (2013.01); *G02B 5/1819* (2013.01); *G02B 27/4272* (2013.01); *G06E 1/00* (2013.01)

(58) Field of Classification Search
CPC .................... G02B 5/18; G02B 5/1814; G02B 5/1819–1823; G02B 5/1847–1857; G02B 5/188; G02B 5/1885; G02B 27/42–43; G06N 3/067–0675; G06E 1/00; G06E 3/00–005
USPC .................................................. 359/560–561
See application file for complete search history.

(56) References Cited

U.S. PATENT DOCUMENTS

| | | | | |
|---|---|---|---|---|
| 4,386,414 A | * | 5/1983 | Case ........................ | G06E 3/001 |
| | | | | 359/107 |
| 6,529,276 B1 | * | 3/2003 | Myrick ..................... | G01J 3/42 |
| | | | | 356/330 |
| 7,787,182 B2 | * | 8/2010 | Stuck ..................... | B42D 25/29 |
| | | | | 359/569 |
| 7,847,225 B2 | | 12/2010 | Yokoyama | |

(Continued)

FOREIGN PATENT DOCUMENTS

| | | |
|---|---|---|
| JP | 2004317802 A | 11/2004 |
| JP | 2010-079174 A | 4/2010 |

(Continued)

OTHER PUBLICATIONS

English machine translation of JP-2012234075-A (Year: 2012).*

(Continued)

*Primary Examiner* — Nicholas R. Pasko
(74) *Attorney, Agent, or Firm* — Osha Bergman Watanabe & Burton LLP

(57) ABSTRACT

An optical computing device includes stacked light diffraction layers contained in a dried gel and each including microcells that have respective refractive indexes set individually and are disposed in a matrix form.

6 Claims, 3 Drawing Sheets

(56) References Cited

U.S. PATENT DOCUMENTS

| | | | | |
|---|---|---|---|---|
| 11,566,942 | B1 * | 1/2023 | Pearson | G02B 27/4272 |
| 2006/0024013 | A1 * | 2/2006 | Magnusson | G02B 6/124 |
| | | | | 385/129 |
| 2007/0247714 | A1 * | 10/2007 | Schnieper | G06K 19/16 |
| | | | | 359/558 |
| 2008/0089073 | A1 * | 4/2008 | Hikmet | G03H 1/22 |
| | | | | 204/157.4 |
| 2012/0162771 | A1 * | 6/2012 | Walter | G02B 5/1847 |
| | | | | 359/569 |
| 2017/0081489 | A1 * | 3/2017 | Rodriques | C08J 3/28 |
| 2018/0274977 | A1 * | 9/2018 | Baik | G02B 5/1809 |
| 2020/0073033 | A1 * | 3/2020 | Baik | G01J 3/0205 |
| 2021/0318658 | A1 * | 10/2021 | Shirakura | G09F 13/16 |
| 2021/0382215 | A1 * | 12/2021 | Kawashita | G02B 5/26 |

FOREIGN PATENT DOCUMENTS

| | | | |
|---|---|---|---|
| JP | 2012234075 A | * | 11/2012 |
| JP | 2017015933 A | | 1/2017 |

OTHER PUBLICATIONS

English Translation of the Written Opinion of the International Searching Authority issued in corresponding International Application No. PCT/JP2022/029768, mailed Oct. 25, 2022 (4 pages).

D. Oran et al., "3D nanofabrication by volumetric deposition and controlled shrinkage of patterned scaffolds," Science, No. 362, pp. 1281-1285, Dec. 14, 2018 (6 pages).

International Search Report issued in corresponding International Application No. PCT/JP2022/029768; mailed Oct. 25, 2022 (3 pages).

Written Opinion of the International Searching Authority issued in corresponding International Application No. PCT/JP2022/029768; dated Oct. 25, 2022 (3 pages).

Saravanamuttu K et al: "Photoinduced structural relaxation and densification in sol-gel-derived nanocomposite thin films: implications for integrated optics device fabrication", Canadian Journal of Chemistry, vol. 76, No. 11,Nov. 1, 1998 (Nov. 1, 1998), pp. 1717-1729, XP002163177, ISSN: 0008-4042, DOI: 10.1139/CJC-76-11-1717 (13 pages).

* cited by examiner

OPTICAL COMPUTING DEVICE AND METHOD FOR PRODUCING SAME

BACKGROUND

Technical Field

The present invention relates to an optical computing device including a plurality of light diffraction layers and a method for producing such an optical computing device.

Description of the Related Art

A known light diffraction layer includes a plurality of microcells that have respective refractive indexes set individually and that are provided in a matrix form. Another known light diffraction layers are designed to perform predetermined optical computing, by stacking the foregoing light diffraction layers on each other on optical paths of beams of signal light and causing the beams of the signal light which have passed through each of the light diffraction layers to interfere with each other. Optical computation (that is, optical computing) with use of a light diffraction layer is performed at a higher speed and a lower power consumption than electric computing with use of a processor. Patent Literature 1 discloses an optical neural network including an input layer, an intermediate layer, and an output layer. The above-described light diffraction layer can be used, for example, as the intermediate layer of such an optical neural network.

In a case where such a technology is applied to computing processing, imaging processing, and the like, the light diffraction layer is preferably configured such that a microcell has a cell size ranging from approximately half to twice a wavelength λs of the signal light. In a case where the cell size ranges from approximately half to twice the wavelength λs, controllability of the signal light can be enhanced. For example, in a case where visible light having λs of 400 nm is used as the signal light, a preferable cell size may be not less than 200 nm and not more than 800 nm. Thus, when an optical computing device including such a light diffraction layer is produced, it is preferable to employ a molding method by which a resolution having a nanometer-order (submicron) size can be achieved.

In recent years, attention has been paid to a molding method called "additive manufacturing" typified by 3D printing. In particular, attention has been paid to a molding method of two-photon 3D printing which is one aspect of optical molding and by which a micro structure can be three-dimensionally and freely processed. However, in a case where the molding method of two-photon 3D printing is used, it is difficult to obtain a resolution of less than 100 nm.

As a technique for improving the resolution of an article molded with use of additive manufacturing, a molding method called "Implosion Fabrication" has been proposed (Non-Patent Literature 1 and Patent Literature 2). In this molding method, optical molding is performed with use of a gel (in this case, hydrogel) that contains a large amount of water, which is one example of a solvent, and that is swollen. After the optical molding, the gel is dehydrated and shrunk. As a result of the dehydration and shrinkage, the gel which has been subjected to optical molding shrinks, along one axis, to approximately one tenth of an original size of the gel while keeping a substantially similar shape. The gel thus becomes a dried gel. In this way, in the Implosion Fabrication, the dehydration and shrinkage allow the final resolution to be increased to approximately ten times a resolution at the time of the optical molding. Thus, the Implosion Fabrication makes it possible to obtain a resolution of less than 100 nm in a three-dimensional structure which has a high degree of freedom.

PATENT LITERATURE

Patent Literature 1: U.S. Pat. No. 7,847,225
Patent Literature 2: US Patent Application Publication No. 2017/0081489

Non-Patent Literature

Non-patent Literature 1: Daniel Oran et. al., Science 362, 1281-1285 (2018) 14 Dec. 2018

SUMMARY

The inventors of the present invention considered that an optical computing device having a resolution of lower than 100 nm could be realized by employing respective dried gels produced by the Implosion Fabrication, as a plurality of light diffraction layers included in the optical computing device, and stacking the light diffraction layers made of the dried gels on each other. This is because, as described above, as a result of the dehydration and shrinkage, a gel used in the Implosion Fabrication shrinks while keeping a substantially similar shape. However, it was found that in a case where a plurality of gels was dehydrated and shrunk, the gels were different in shrinkage rate and shrinkage uniformity.

This means that in a case where the respective dried gels generated by the Implosion Fabrication are employed as the plurality of light diffraction layers included in the optical computing device, and the light diffraction layers are stacked on each other, microcells in each of the light diffraction layers are likely to vary in cell size and position. Such variations in the cell size and position may increase a computation error of the optical computing device and make it difficult to perform accurate computing.

One or more embodiments can provide, by reducing variations in cell size and position due to dehydration and shrinkage in the optical computing device in which a plurality of microcells provided in a matrix form are disposed so as to be stacked on each other, an optical computing device which performs highly accurate computing.

An optical computing device in accordance with one or more embodiments includes a plurality of light diffraction layers (stacked light diffraction layers) stacked on each other. Each of the light diffraction layers includes a plurality of microcells which have respective refractive indexes set individually and which are provided in a matrix form, and the plurality of light diffraction layers are contained in a dried gel.

A production method in accordance with one or more embodiments is a production method for an optical computing device including a plurality of light diffraction layers (stacked light diffraction layers) stacked on each other. The present production method includes: a first step of dispersing a pigment in a gel containing a solvent; a second step of forming, with use of a two-photon absorption method, a pattern corresponding to the plurality of light diffraction layers in the gel by exposing the gel in which the pigment has been dispersed; a third step of removing the pigment from the gel after forming the pattern; and a fourth step of obtaining a dried gel (a shrunk dried gel) that is caused to shrink by removing the solvent from the gel from which the pigment has been removed, the dried gel containing the plurality of light diffraction layers.

According to one or more embodiments, in an optical computing device in which a plurality of microcells provided in a matrix form are disposed so as to be stacked on each other, it is possible to reduce variations which occur in cell size and position due to dehydration and shrinkage.

DESCRIPTION OF THE EMBODIMENTS

Example 1

Figure 1:
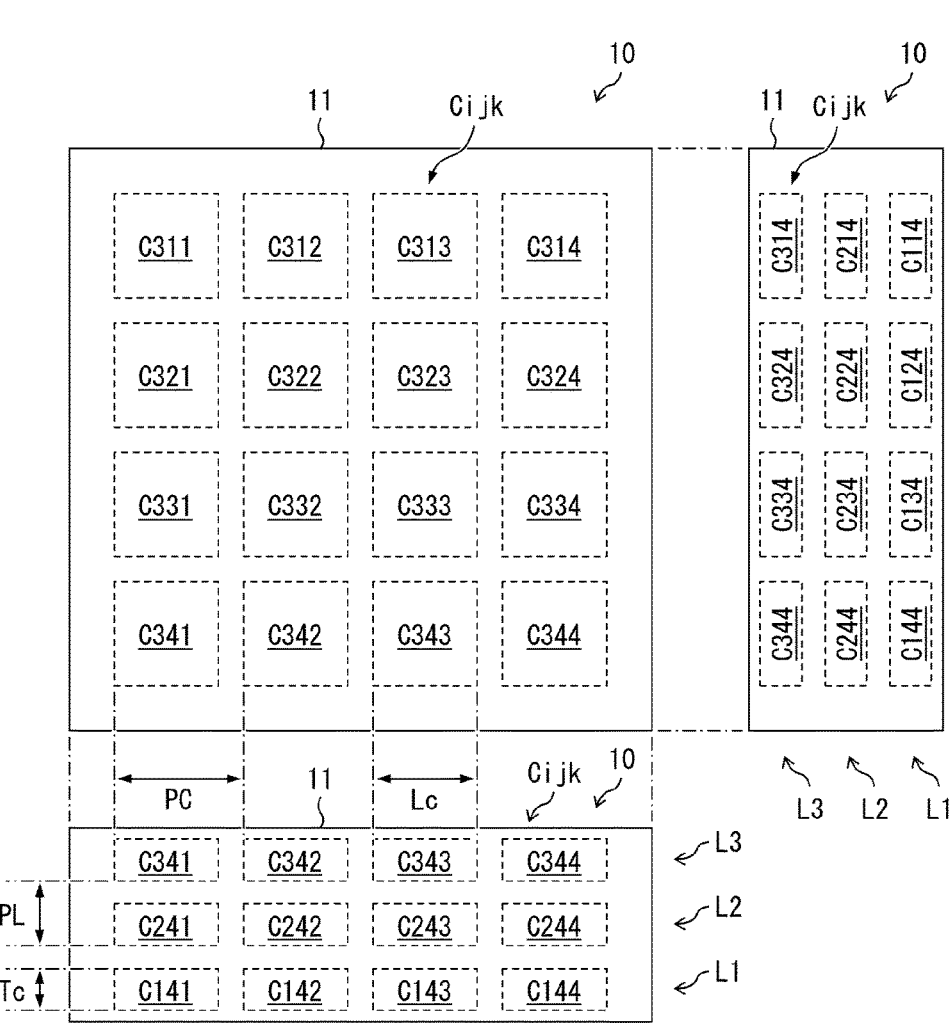
FIG. 1 is a three-view drawing of an optical computing device in accordance with one or more embodiments.

The following will describe, with reference to FIG. 1, an optical computing device 10 in accordance with one or more embodiments. FIG. 1 is a three-view drawing of the optical computing device 10. FIG. 1 is a face view that shows a top surface which is seen in plan view and which is one of a pair of main surfaces including the top surface and a bottom surface of the optical computing device 10. FIG. 1 also includes a front view and a left-side view that show, respectively, front-side and left-side surfaces of the optical computing device 10 which are seen in plan view.

<Configuration of Optical Computing Device>

As illustrated in FIG. 1, the optical computing device 10 includes a dried gel 11. The dried gel 11 contains n (n is an integer of not less than 2; in Example 1, n=3) light diffraction layers Li (i is an integer of $1 \leq i \leq n$) which are stacked on each other. In one or more embodiments, a light diffraction layer L1 is disposed so as to be close to a bottom surface of the dried gel 11, and a light diffraction layer L2 and a light diffraction layer L3 are stacked on the light diffraction layer L1 in this order.

Each of the light diffraction layers Li includes a plurality of microcells Cijk provided in the form of a matrix of m rows and l columns. Here, each of m and l is an integer of not less than 2, and in Example 1, m=4 and l=4. Further, j is an integer of $1 \leq j \leq m$, and k is an integer of $1 \leq k \leq l$. In this way, the microcells Cijk included in the light diffraction layer Li are provided in a square matrix form. For the microcells Cijk, at least respective refractive indexes are set individually and independently of each other. Further, for the microcells Cijk, respective thicknesses Tc in addition to the refractive indexes may be set individually and independently of each other. In a case where the respective refractive indexes of the microcells Cijk are desired to have a distribution in a wide range that cannot be achieved in a case where the thickness of the microcells Cijk is uniform, microcells Cijk may be configured to be thicker. According to this configuration, it is possible to increase a shift amount of a phase that changes in a case where signal light passes through the microcells Cijk which have a thin thickness Tc. In one or more embodiments, in the microcells Cijk, only the refractive indexes are set individually and independently of each other, and the thickness Tc is constant. Although the thickness Tc can be set as appropriate, typically, the thickness Tc is substantially equal to the wavelength λs of the signal light.

Here, the term "microcell" means, for example, a cell having a cell size of less than 10 μm. The cell size is a square root of an area of a cell. For example, in a case where a microcell seen in plan view, like the microcell Cijk, has a shape of a square, the cell size is a length Lc of one side of the cell. There is no specific value for a lower limit of the cell size, but the lower limit is, for example, 1 nm.

In the optical computing device 10, the number n of the light diffraction layers Li, the number m of rows of the plurality of microcells Cijk, and the number l of columns of the plurality of microcells Cijk are not limited to the above-described example, but can be set as appropriate. For example, the number n of the layers may be 2 or may be 10. Further, the number m of the rows and the number l of the columns may be, for example, 200 or 4000. The number n of the layers, the number m of the rows, and the number l of the columns can be set as appropriate in accordance with the content of desired optical computing to be performed with use of the optical computing device 10.

In the optical computing device 10, the signal light enters one of the main surfaces (for example, the bottom surface) of the dried gel 11, and exits from the other one of the main surfaces (for example, a top surface) of the dried gel 11. In the face view of FIG. 1, a region in which the microcells Cijk are formed is called an "effective region" in the optical computing device 10.

An interlayer pitch PL and the length Lc, which is a cell size of the microcell Cijk, are set in association with the wavelength λs of the signal light.

The interlayer pitch PL is preferably an integer multiple of the wavelength λs of the signal light. In one or more embodiments, the interlayer pitch PL is 40 λs. For example, in a case where the signal light of λs=400 nm is employed, PL=16 μm. The interlayer pitch PL is a pitch between adjacent light diffraction layers Li and Li+1.

The cell size of the microcell is preferably set within a range of not less than λs/2 and not more than 2λs. That is, in the microcell Cijk, the length Lc is preferably set within the range of not less than λs/2 and not more than 2λs. For example, in a case where the signal light of λs=400 nm is employed, the length Lc is preferably set within a range of not less than 200 nm and not more than 800 nm. This makes it possible to increase controllability of the signal light.

Furthermore, an intercell pitch Pc, which is a pitch between adjacent microcells (for example, which are a microcell Cijk and a microcell Cijk+1) in a single light diffraction layer Li, can be set as appropriate within a range of more than the length Lc.

(Dried Gel)

The dried gel 11 is made of a material that is transparent to the signal light. The gel of which the dried gel 11 is made can be selected as appropriate from gels that are used in the Implosion Fabrication (see, for example, Non-Patent Literature 1, Patent Literature 2, and the specification of Japanese Patent Application, Tokugan, No. 2021-025680).

The dried gel 11 is obtained by drying a gel. The term "gel" is a generic term for a solid matter in which dispersoids are connected with each other to be a network. A point at which the dispersoids are connected with each other is called a "cross-linking point". The gel can absorb a solvent into the network, so that the gel can become a swollen gel. Further, when the solvent that the gel contains is dried, the gel shrinks while releasing the solvent. As a result, the gel becomes a dried gel. In addition, when the gel becomes the dried gel, it is possible to fix a structure of the dried gel to some extent by performing an additional process, such as cross-linking, for stabilizing a dimension of the dried gel. A shrinkage rate obtained by a comparison between the gel and the dried gel varies according to, for example, composition of the dispersoids. In the case of the gel that is used in the Implosion Fabrication and that will be described later, a typical shrinkage rate is approximately $1/10$ to $1/100$. In the optical computing device 10, the plurality of light diffraction layers Li, each of which includes the plurality of microcells Cijk, are provided in the single dried gel 11. In a case where the plurality of light diffraction layers Li is formed inside the single dried gel 11, it is possible to reduce variations which may occur in shrinkage rate between the light diffraction layers Li. Therefore, it is possible to reduce variations which may occur in cell size and position of a case where a plurality of light diffraction layers is configured with use of a plurality of dried gels. In addition, it is unnecessary to stack a plurality of separately provided light diffraction layers on each other. This makes it possible to omit an alignment adjustment of the plurality of light diffraction layers.

Furthermore, in a case where accuracy is required in shrinkage from the gel to the dried gel, the gel is preferably configured so that the shrinkage rate can be controlled to be approximately $1/10$. That is, the dried gel has a volume that is preferably approximately $1/1000$ of a volume of the gel. The accuracy of shrinkage can be also expressed as shrinkage uniformity of the gel. In a case where the shrinkage uniformity of the gel is enhanced, it is possible to further reduce variations which may occur in cell size and position in each of the light diffraction layers Li.

The gel can be classified into a chemical gel and a physical gel. In the chemical gel, the dispersoids are bonded to each other by covalent bonds. In contrast, in the physical gel, the dispersoids are bonded to each other by bonds other than the covalent bonds (for example, intermolecular forces). Further, of the chemical gels, a gel whose dispersoid is a polymer compound is called a "polymer gel". In one or more embodiments, the polymer gel is employed as the gel which becomes the dried gel 11 by drying the solvent.

Furthermore, the gel can be classified, depending on a polarity of the solvent that the gel can absorb, into a hydrophilic gel, a hydrophobic gel, and a gel intermediate between the hydrophilic gel and the hydrophobic gel. The hydrophilic gel absorbs a solvent which has a high polarity (for example, water and lower alcohols). The hydrophobic gel absorbs a solvent which has a low polarity (for example, cyclohexane and normal hexane). The gel intermediate between the hydrophilic gel and the hydrophobic gel absorbs a solvent which has an intermediate polarity (for example, diethyl ether and ethyl acetate). In one or more embodiments, the hydrophilic gel is employed as the gel which becomes the dried gel 11 by drying the solvent. The hydrophilic gel is also called a "hydrogel".

It is possible to set, as appropriate, a content of the solvent (in hydrogel, water content) of the dried gel 11 within a range of not more than 30%. Note that the content of the solvent of the dried gel 11 can be defined as a ratio of the mass of the solvent contained in the dried gel 11 with respect to the total mass of the dried gel 11. The lower the content is, the smaller the size of the dried gel 11 becomes. Thus, the lower content results in reduction in cell size in each of the light diffraction layers Li.

Variation 1

Figure 2:
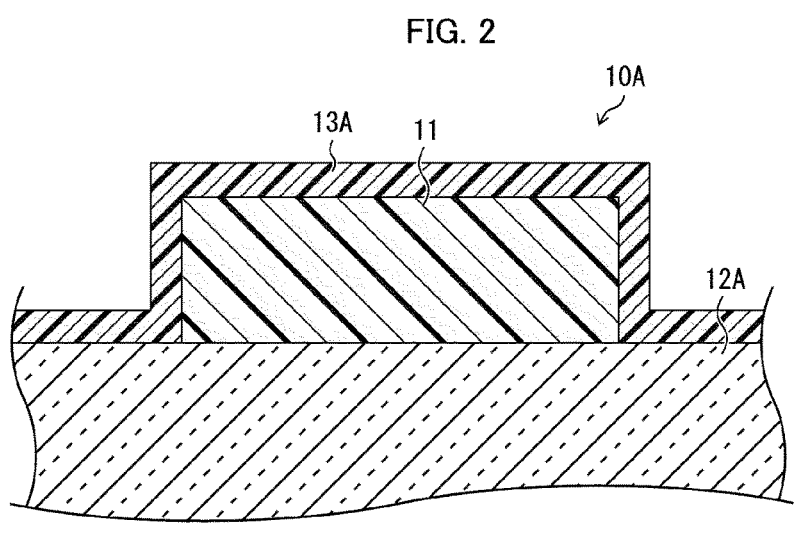
FIG. 2 is a cross-sectional view of a variation of the optical computing device illustrated in FIG. 1.

The following will describe, with reference to FIG. 2, an optical computing device 10A, which is Variation 1 of the optical computing device 10. FIG. 2 is a cross-sectional view of the optical computing device 10A. Note that light diffraction layers Li which are contained in a dried gel 11 are omitted in FIG. 2.

As illustrated in FIG. 2, the optical computing device 10A includes the dried gel 11, a transparent substrate 12A and a resin layer 13A. The dried gel 11 of the optical computing device 10A is identical with the dried gel 11 of the optical computing device 10. Therefore, the dried gel 11 is not described in Variation 1.

The transparent substrate 12A is a substrate which is transparent to signal light. In one or more embodiments, the transparent substrate 12A is a glass substrate made of quartz glass. Note that the transparent substrate 12A is made of a material that is not limited to quartz glass, but that can be decided as appropriate. For example, the material of which the transparent substrate 12A is made can be a resin which is transparent to the signal light. In addition, the transparent substrate 12A may be a rigid substrate or may be a soft substrate. Note that in a case where the transparent substrate 12A is a soft substrate, it is preferable that a frame be attached to the transparent substrate 12A so as to surround the dried gel 11. This makes it possible to keep the transparent substrate 12A undeformed and flat.

The dried gel 11 is placed on one (in FIG. 2, an upper main surface) of main surfaces of the transparent substrate 12A.

The transparent substrate 12A is provided so as to support the dried gel 11 and to prevent the dried gel 11 from coming into contact with air. The transparent substrate 12A covers a lower main surface of the dried gel 11.

The resin layer 13A is made of a resin which is transparent to the signal light. The resin layer 13A is provided so as to prevent the dried gel 11 from coming into contact with air. The resin layer 13A is one example of a moisture-proof layer. The resin layer 13A is configured so as to have a moisture permeability of preferably not more than 150 $g/m^2/24$ hr, more preferably not more than 50 $g/m^2/24$ hr, and the most preferably not more than 10 $g/m^2/24$ hr. In order to define the moisture permeability, it is possible to employ an evaluation index under test conditions of 40° C. and 90% RH of the dish method test defined in JIS Z 0208. According to this configuration, the resin layer 13A can reduce absorption of moisture in air by the dried gel 11. This makes it possible to keep the size of the dried gel 11 constant. The resin layer 13A covers an upper main surface and side surfaces of the dried gel 11, and one of the main surfaces of the transparent substrate 12A.

It is possible to suitably use, as the resin layer 13A, a hard coat layer that is used for protecting a panel surface of a display panel. That is, suitable examples of the resin of which the resin layer 13A is made include a photo-curable methacrylate resin. The hard coat layer is configured to have a hardness exceeding a predetermined hardness, and has abrasion resistance. The predetermined hardness can be set as appropriate. In order to define the predetermined hardness, it is possible to employ an evaluation index in the pencil hardness test defined in JIS K 5600 and the like or an evaluation index of abrasion resistance measured with use of a steel wool or the like to which an appropriate load is applied by a surface hardness abrasion tester or the like. Use of the hard coat layer as the resin layer 13A makes it possible to keep the size of the dried gel 11 constant and to make it possible to prevent the dried gel 11 from being deformed or damaged by external force.

In this way, the transparent substrate 12A and the resin layer 13A are configured to enclose the dried gel 11. The transparent substrate 12A and the resin layer 13A function as moisture-proof layers. In one or more embodiments, the refractive indexes of the transparent substrate 12A and the resin layer 13A are set so as to be lower than the refractive index of the dried gel 11 and higher than the refractive index of air.

Variation 2

Figures 3, 4:
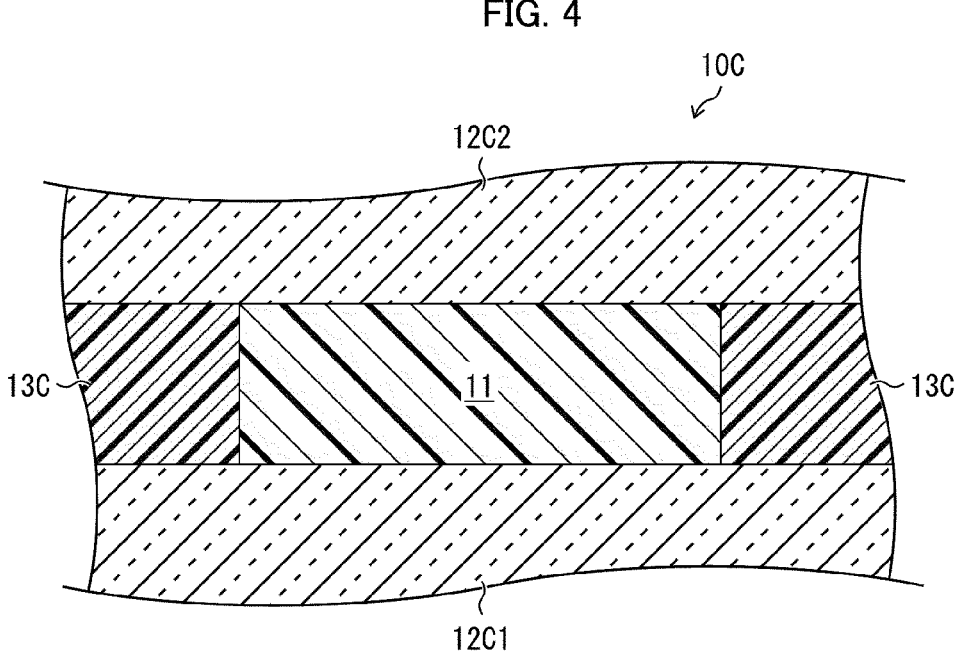
FIG. 3 is a cross-sectional view of another variation of the optical computing device illustrated in FIG. 1.
FIG. 4 is a cross-sectional view of another variation of the optical computing device illustrated in FIG. 1.

The following will describe, with reference to FIG. 3, an optical computing device 10B, which is Variation 2 of the optical computing device 10 and which is also a variation of the optical computing device 10A. FIG. 3 is a cross-sectional view of the optical computing device 10B.

The optical computing device 10B includes a dried gel 11, a transparent substrate 12A (not illustrated in FIG. 3), a resin layer 13A, and a resin layer 14B. The optical computing device 10B can be obtained by adding the resin layer 14B to the optical computing device 10A. Therefore, in Variation 2, the resin layer 14B will be described, but descriptions of the dried gel 11, the transparent substrate 12A, and the resin layer 13A are omitted.

The resin layer 14B covers an effective region (that is, a region which covers a top surface of the dried gel 11) of the resin layer 13A, which is one of moisture-proof layers. The resin layer 14B is made of a resin which is transparent to signal light. The resin layer 14B is configured to have a refractive index that is lower than the refractive index of the resin layer 13A and that is higher than the refractive index of air. The resin layer 14B functions as a low refractive index layer.

The resin layer 14B is made of a material that is not particularly limited but that can be selected from existing materials as appropriate in accordance with the refractive index. The resin layer 14B may be made of an acrylate resin to which fluorine has been added or may be made of a resin inside which fine air bubbles have been dispersed. In a case where the air bubbles are dispersed inside the resin, sizes of the air bubbles are preferably less than the wavelength $\lambda$s of the signal light.

Note that in an aspect of the optical computing device 10B, the optical computing device 10B may further include a resin layer that covers another effective region (that is, a region which covers a bottom surface of the dried gel 11) of the transparent substrate 12A, which is the other of the moisture-proof layers. This resin layer may be configured in a similar manner to the resin layer 14B.

Variation 3

The following will describe, with reference to FIG. 4, an optical computing device 10C, which is Variation 3 of the optical computing device 10. FIG. 4 is a cross-sectional view of the optical computing device 10C.

The optical computing device 10C includes a dried gel 11, a pair of transparent substrates 12C1 and 12C2, and a resin layer 13C.

The transparent substrate 12C1 is configured so as to be identical to the transparent substrate 12A of the optical computing device 10A. That is, the transparent substrate 12C1 covers a bottom surface of the dried gel 11.

The transparent substrate 12C2 is a glass substrate which is configured in a similar manner to the transparent substrate 12C1. The transparent substrate 12C2 is placed on a top surface of the dried gel 11 such that the transparent substrates 12C1 and 12C2 sandwich the dried gel 11. Therefore, the transparent substrate 12C2 covers the top surface of the dried gel 11.

The resin layer 13C is made of the same resin as the resin layer 13A of the optical computing device 10A. However, the resin layer 13C fills a space between the transparent substrate 12C1 and 12C2, and covers the side surfaces of the dried gel 11.

The transparent substrate 12C1, the transparent substrate 12C2, and the resin layer 13C function as moisture-proof layers.

The transparent substrate 12C1 and the transparent substrate 12C2, like the transparent substrate 12A, may be rigid substrates or may be soft substrates.

In one or more embodiments, the transparent substrate 12C1, the transparent substrate 12C2, and the resin layer 13C are each configured to have a refractive index that is lower than the refractive index of the dried gel 11 and that is higher than the refractive index of air.

Example 2

Figure 5:
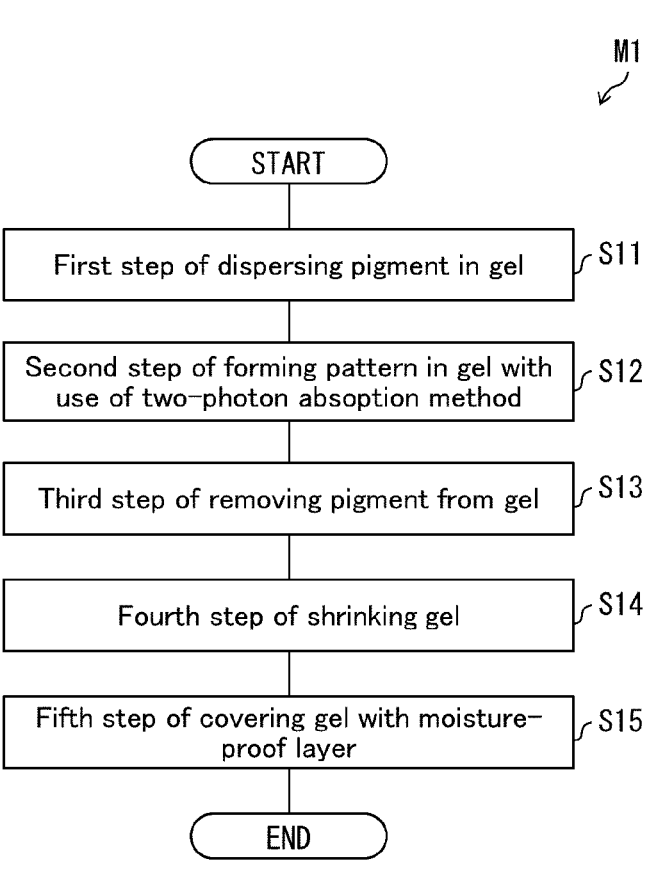
FIG. 5 is a flowchart of a production method in accordance with one or more embodiments.

The following will describe, with reference to FIG. 5, a production method M1 in accordance with one or more embodiments. FIG. 5 is a flowchart of the production method M1. In one or more embodiments, the production method M1 will be described by taking, as an example, a case where an optical computing device 10A is produced. However, it is possible to apply a first step S11 to a fourth step S14 included in the production method M1, to a case where any of an optical computing device 10, an optical computing device 10B, and an optical computing device 10C is produced.

<Gel>

In one or more embodiments, the production method M1 will be described on the assumption that the term "initial state" refers to a state in which a gel containing a solvent is placed on a top surface of a transparent substrate 12A.

The gel used in the initial state can be selected as appropriate from gels which can be used in the Implosion Fabrication.

The gel used in the initial state is disclosed in, for example, Non-Patent Literature 1 and Patent Literature 2. In addition, it is possible to use, as the gel used in the initial state, a multi-block copolymer that is disclosed in the specification of Japanese Patent Application, Tokugan, No. 2021-025680. In this multi-block copolymer, a first segment and a second segment, each of which is constituted by one or more block polymers, are alternately bonded. Here, the first segment is hydrophobic, and the second segment is hydrophilic. In addition, the multi-block copolymer is configured to have not less than three segments in total.

<Arrangement of Production Method>

As shown in FIG. 5, the production method M1 includes a first step S11, a second step S12, a third step S13, a fourth step S14, and a fifth step S15.

The first step S11 is a step of dispersing a pigment in a gel that contains a solvent. This pigment is selected as appropriate in accordance with composition of the gel that is used in the initial state (see, for example, Non-Patent Literature 1, Patent Literature 2, and the specification of Japanese Patent Application, Tokugan, No. 2021-025680).

The second step S12 is a step of forming, with use of the two-photon absorption method, a pattern corresponding to a plurality of light diffraction layers Li in a gel. This pattern is formed by exposing the gel in which the pigment has been dispersed. That is, in the second step S12, areas corresponding to respective microcells Cijk are irradiated with laser light, intensities of which are set individually and independently of each other. A dispersoid absorbs two photons of the laser light, so that the dispersoid is bonded with the pigment. Thus, in each of the microcells Cijk, the pigment is bonded in an amount corresponding to the intensity of the laser light. The pigment which has been introduced in accordance with the intensity of the laser light can be further bonded, in accordance with the amount of the pigment, with fine particles having a refractive index that differs from the refractive index of the dried gel. This makes it possible to set the refractive indexes of the respective microcells Cijk individually and independently of each other. Examples of the fine particles having a higher refractive index than the dried gel include titanium oxide nanoparticles and nanodiamonds. Examples of the fine particles having a lower refractive index than the dried gel include fluoride nanoparticles.

Forming the pattern with use of the two-photon absorption method is one aspect of optical molding and is hereinafter also called "two-photon 3D printing". In the two-photon absorption method, a focus position of the laser light (excitation light), with which irradiation is carried out, can be moved not only in an in-plane direction of main surfaces of the dried gel 11 but also in a normal direction of the main surfaces of the dried gel 11. Thus, in the two-photon 3D printing, it is possible to freely and three-dimensionally process a micro structure.

The third step S13 is a step of removing the pigment from the gel by cleaning the gel after forming the pattern in the second step S12. As a result of performing the third step S13, the pigment which is bonded with the dispersoid remains in the areas corresponding to the respective microcells Cijk in the gel, and the pigment which is not bonded with the dispersoid is removed from the gel.

The fourth step S14 is a step of removing the solvent from the gel in which the pigment has been removed in the third step S13. As a result of performing the fourth step S14, the gel shrinks and changes into the dried gel. The content of the solvent in the dried gel 11 can be set as appropriate within a range of not more than 30%. The lower the content is, the smaller the dried gel 11 becomes. Thus, the lower content results in reduction in cell size in each of the light diffraction layers Li.

The fifth step S15 is a step of applying a liquid resin onto the top surface of the transparent substrate 12A and the surfaces of the dried gel 11 and curing the liquid resin. The liquid resin is a material of the resin layer 13A. As a result of curing the liquid resin, the resin layer 13A is formed on the top surface of the transparent substrate 12A and the surfaces of the dried gel 11, and the dried gel 11 is enclosed by the transparent substrate 12A and the resin layer 13A. Each of the transparent substrate 12A and the resin layer 13A is one example of a moisture-proof layer.

Note that in a case where the optical computing device 10B is produced, it is necessary only to add, after the fifth step S15, a step of forming a resin layer 14B, which is one example of a low refractive index layer, on the resin layer 13A in at least a region which covers the dried gel 11.

Additional Remarks

The present invention is not limited to the embodiments, but can be altered by a skilled person in the art within the scope of the claims. The present invention also encompasses, in its technical scope, any embodiment derived by combining technical means disclosed in differing embodiments.

Aspects of the present invention can also be expressed as follows:

An optical computing device in accordance with Aspect 1 of the present invention includes: a plurality of light diffraction layers. Each of the light diffraction layers includes a plurality of microcells which have respective refractive indexes set individually and which are provided in a matrix form, and the plurality of light diffraction layers are contained in a dried gel.

According to the above configuration, a plurality of light diffraction layers is contained in a single dried gel. This makes it possible to produce an optical computing device without use of a plurality of dried gels. Therefore, it is possible to reduce variations which may occur in cell size and position in a case where the plurality of light diffraction layers is configured with use of a plurality of dried gels. In the optical computing device which is produced by applying such a configuration and in which variations in cell size and position are reduced, it is possible to perform more accurate computing in which less errors occur.

Moreover, in an optical computing device which causes a plurality of light diffraction layers to sequentially act on signal light and which includes the light diffraction layers disposed in respective separate dried gels, it is important to adjust position and direction of each of the light diffraction layers with respect to the signal light to predetermined position and direction. This is because in a case where the position and direction of the light diffraction layer with respect to the signal light are displaced from the predetermined position and direction, it is difficult to cause a desired action on the signal light. Hereinafter, the foregoing adjustment is called "alignment adjustment". According to the above configuration, the plurality of light diffraction layers is disposed in the single dried gel. This makes it possible to omit the alignment adjustment during production. Note that in the alignment adjustment, it is possible to adjust only misalignment between the light diffraction layers, that is, only an error which is caused by an in-plane horizontal movement. In the alignment adjustment, it is impossible to perfectly adjust variations in cell size of the light diffraction layers due to, for example, respective different shrinkage rates of the light diffraction layers. However, according to the above configuration in which the plurality of light diffraction layers is disposed in the single dried gel, it is possible to reduce such variations in cell size.

Further, the optical computing device in accordance with Aspect 2 of the present invention employs, in addition to the above-described configuration of the optical computing device in accordance with Aspect 1, a configuration in which the optical computing device further includes a moisture-proof layer that is transparent to signal light and that encloses the dried gel.

According to the above-described configuration, it is possible to block a contact between the dried gel and air. Thus, it is possible to reduce absorption of moisture in air by the dried gel. Therefore, it is possible to keep the size of the dried gel constant regardless of an external environment.

Further, the optical computing device in accordance with Aspect 3 of the present invention employs, in addition to the above-described configuration of the optical computing device in accordance with Aspect 2, a configuration in which the moisture-proof layer has a refractive index that is lower than a refractive index of the dried gel and that is higher than a refractive index of air.

According to the above-described configuration, it is possible to reduce a reflection which may occur at an interface between the dried gel and air in a case where the moisture-proof layer is not included.

Further, the optical computing device in accordance with Aspect 4 of the present invention employs, in addition to the above-described configuration of the optical computing device in accordance with Aspect 3, a configuration in which the optical computing device further includes a low refractive index layer that covers an effective region of the moisture-proof layer and that has a refractive index which is lower than a refractive index of the moisture-proof layer and which is higher than the refractive index of air.

According to the above-described configuration, it is possible to reduce a reflection which may occur at an interface between the moisture-proof layer and air in a case where the low refractive index layer is not included.

A production method in accordance with Aspect 5 of the present invention is a method for producing an optical computing device including a plurality of light diffraction layers stacked on each other. The present production method includes: a first step of dispersing a pigment in a gel containing a solvent; a second step of forming, with use of a two-photon absorption method, a pattern corresponding to the plurality of light diffraction layers in the gel by exposing the gel in which the pigment has been dispersed; a third step of removing the pigment from the gel after forming the pattern; and a fourth step of obtaining a dried gel that is caused to shrink by removing the solvent from the gel from which the pigment has been removed, the dried gel containing the plurality of light diffraction layers.

The above-described configuration brings about an effect similar to that of the optical computing device in accordance with Aspect 1.

The production method in accordance with Aspect 6 of the present invention employs, in addition to the above-described configuration of the production method in accordance with Aspect 5, a configuration in which the production method further includes a fifth step of enclosing the dried gel with use of a moisture-proof layer which is transparent to signal light.

The above-described configuration brings about an effect similar to that of the optical computing device in accordance with Aspect 2.

REFERENCE SIGNS LIST

10, 10A, 10B, 10C Optical computing device
11 Dried gel

Li Light diffraction layer
Cijk Microcell
12A, 12C1, 12C2 Transparent substrate
13A, 14B, 13C Resin layer

The invention claimed is:

1. An optical computing device comprising:
stacked light diffraction layers that are:
   disposed on optical paths of beams of signal light,
   configured to perform predetermined optical computing by causing the beams of the signal light that have passed through each of the light diffraction layers to interfere with each other, and
   contained in a single dried gel, wherein
   each of the stacked light diffraction layers comprises microcells disposed in a matrix form and that have respective refractive indexes set individually so as to perform the predetermined optical computing.

2. The optical computing device according to claim 1, further comprising a moisture-proof layer that is transparent to signal light and that encloses the dried gel.

3. The optical computing device according to claim 2, wherein the moisture-proof layer has a refractive index lower than a refractive index of the dried gel and higher than a refractive index of air.

4. The optical computing device according to claim 3, further comprising a refractive index layer that covers an effective region of the moisture-proof layer and that has a refractive index lower than the refractive index of the moisture-proof layer and higher than the refractive index of air.

5. A method for producing the optical computing device according to claim 1, the method comprising:
   dispersing a pigment in a gel containing a solvent;
   forming, using a two-photon absorption method, a pattern corresponding to the stacked light diffraction layers in the gel by exposing the gel in which the pigment has been dispersed;
   removing the pigment from the gel after forming the pattern; and
   removing the solvent from the gel from which the pigment has been removed to obtain a shrunk dried gel containing the stacked light diffraction layers.

6. The method according to claim 5, further comprising enclosing the shrunk dried gel with a moisture-proof layer transparent to signal light.

* * * * *